(12) United States Patent
Mastrangelo et al.

(10) Patent No.: US 8,886,944 B2
(45) Date of Patent: Nov. 11, 2014

(54) WATERMARK TO IDENTIFY LEAK SOURCE

(75) Inventors: Michael P. Mastrangelo, Seattle, WA (US); Jose Emmanuel Miranda-Steiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/821,121

(22) Filed: Jun. 22, 2010

(65) Prior Publication Data
US 2011/0314550 A1 Dec. 22, 2011

(51) Int. Cl.
*H04L 9/32* (2006.01)
*G06F 7/04* (2006.01)
*G06F 17/30* (2006.01)
*H04N 7/16* (2011.01)
*H04N 1/32* (2006.01)
*H04N 1/00* (2006.01)
*G06T 1/00* (2006.01)

(52) U.S. Cl.
CPC .... *H04N 1/32208* (2013.01); *H04N 2201/3271* (2013.01); *H04N 2201/3205* (2013.01); *H04N 1/32251* (2013.01); *H04N 2201/328* (2013.01); *H04N 2201/323* (2013.01); *H04N 1/00843* (2013.01); *H04N 1/32309* (2013.01); *H04N 1/00854* (2013.01); *H04N 1/00846* (2013.01); *G06T 1/0021* (2013.01)
USPC ................................ 713/176; 726/26; 726/32

(58) Field of Classification Search
CPC ............. G06T 1/0021; H04N 1/00864; H04N 1/0087; H04N 1/00854; H04N 1/32208; H04N 1/32309; H04N 2201/3205; H04N 2201/323
USPC ............................................. 726/26; 713/176
See application file for complete search history.

(56) References Cited

U.S. PATENT DOCUMENTS

| 7,603,720 | B2 | 10/2009 | Rockwood et al. |
| 2007/0143603 | A1 | 6/2007 | Hadden et al. |
| 2008/0126359 | A1* | 5/2008 | Rhoads .......................... 707/10 |
| 2009/0129627 | A1 | 5/2009 | Levy et al. |
| 2009/0147985 | A1 | 6/2009 | Chen et al. |
| 2010/0077463 | A1* | 3/2010 | Rickelton-Abdi ................ 726/5 |

(Continued)

OTHER PUBLICATIONS

Enabling Hierarchical and Bulk-Distribution forWatermarked Content Germano Caronni and Christoph Schuba Sun Microsystems, Inc. Published in Proceedings of the 17th Annual Computer Security Applications Conference (ACSAC), New Orleans, Dec. 2001.*

(Continued)

*Primary Examiner* — Kambiz Zand
*Assistant Examiner* — Benjamin Kaplan
(74) *Attorney, Agent, or Firm* — Bryan Webster; Kate Drakos; Micky Minhas

(57) ABSTRACT

Watermarks may be used to deter certain types of information leaks. In one example, leaks occur in the form of posting, in public forums, screen shots of private pages. To deter this example kind of leak, private web pages within an organization may be watermarked with an experience identifier that identifies the session in which the screen shot is captured. Other information may also be included in the watermark. The watermark may be designed to survive image compression, so that it can be recovered from either a compressed or uncompressed image of the web page. By using an experience identifier recovered from the watermark, and logs that describe activity associated with that experience identifier, it may be possible to identify the source of the information leak.

20 Claims, 5 Drawing Sheets

(56) References Cited

U.S. PATENT DOCUMENTS

| | | | |
|---|---|---|---|
| 2010/0142749 A1* | 6/2010 | Rhoads et al. | 382/100 |
| 2010/0153734 A1* | 6/2010 | Moskowitz et al. | 713/179 |
| 2011/0209224 A1* | 8/2011 | Gentile et al. | 726/27 |
| 2011/0242605 A1* | 10/2011 | Hasama | 358/1.15 |

OTHER PUBLICATIONS

Anan, et al., "Watermarking Technologies for Security-Enhanced Printed Documents", retrieved at << http://www.fujitsu.com/downloads/MAG/vol43-2/paper06.pdf >>, Fujitsu Sci. Tech. J., Apr. 2007, pp. 197-203, vol. 43, No. 2.

Cox, et al., "Watermarking applications and their properties", Proceedings of the the International Conference on Information Technology: Coding and Computing (ITCC'00), dated: 2000, pp. 1-5, Las Vegas.

"Forensic Marking for Screeners", retrieved at << http://www.xifudigital.com/english/pdf/Thounson-Rimage_NexGuardFM_Screener_Dec07.pdf >>, dated: Dec. 2007, 2 pages.

Nguepi, Aime Serge Nguimjeu, "Digital Watermarking", retrieved at << http://www.secinformatik.tu-darmstadt.de/pages/lehre/SS07/sem_misc/papers/nguepi.pdf >>, dated: Apr. 18, 2007, pp. 1-11.

"Embedding Data in Digital Images Student Project Assignment", retrieved at << http://www.realworldengineering.org/download.php-?proj=490&file=RWEP_Final2_12_Student%20assignment1.docx >>, retrieved on Mar. 12, 2010, 3 pages.

\* cited by examiner

WATERMARK TO IDENTIFY LEAK SOURCE

BACKGROUND

The relative ease with which digital information can flow creates a potential for organizational leaks. Businesses and other organizations often keep their information on computer, in digital form. Employees, vendors, or others with some relationship to the organization may be given access to the digital information. As a condition for gaining access, these people generally have to agree not to disclose the information outside of the organization. However, information sometimes does leak out of the company, either through error or malice.

One way that information leaks from the company is when a person with access to the information captures a screen shot that contains the information. For example, a software company might be testing a new on-line service, and might give access to a test version of the service only to certain employees. An employee might capture a screen shot and post the screen shot on a blog. In some cases, the employee might be confused about whether he or she was allowed to publicize what was shown on the screen. In other cases, the employee may be executing his or her own private agenda. Either way, the company may want to trace the source of the leak, either to impose consequences on the employee or as a way of deterring future leaks.

SUMMARY

The source of leaks may be identified by watermarking proprietary material in a way that is likely to lead to the person involved in the leak. A company's (or other organization's) private information may be stored in the form of digital information, and may be accessed through some type of software such as a browser. When the software is started, an experience identifier may be created, which is kept through the entire session of use of that software. A different experience identifier may be created for each instantiation of the software. The company's sources of information that are accessed through the software may be instrumented to obtain the experience identifier from the software. The instrumented software may log the fact that a particular information source was accessed with a particular experience identifier. Additionally, when the instrumented software displays a view of information to the user, the software may watermark that view with the experience identifier, and possibly other information. The watermark may be visually difficult to detect, but may be recoverable through simple mechanisms. In this way, a screen shot can later be analyzed to determine what experience identifier was in place when the screen shot was captured.

By logging the activity that occurs under a particular experience identifier, the identity of the person using that identifier may be determined. For example, the person might visit some sites anonymously, and then may log in as a particular user during the same session. This login event then associates the experience identifier with a particular user. Even if there is no login event to identify the user, the pattern of activity that occurred under a particular experience identifier (e.g., the data accessed, the sites visited, the time of day, the IP address from which the access is made, etc.) might be used to identify the user associated with the experience identifier. While it might appear as if reconstructing a user's identify from the use of an experience identifier contravenes the user's expectation of privacy, in reality it does not. The company's right to use and log experience identifiers can be established through privacy policies that are made known to employees. And, if the user's identity becomes known to the company when it recovers information from a watermarked screen shot, then it is the user's own act of disseminating private information—in violation of his agreement not to do so—that allows his identity to be discovered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
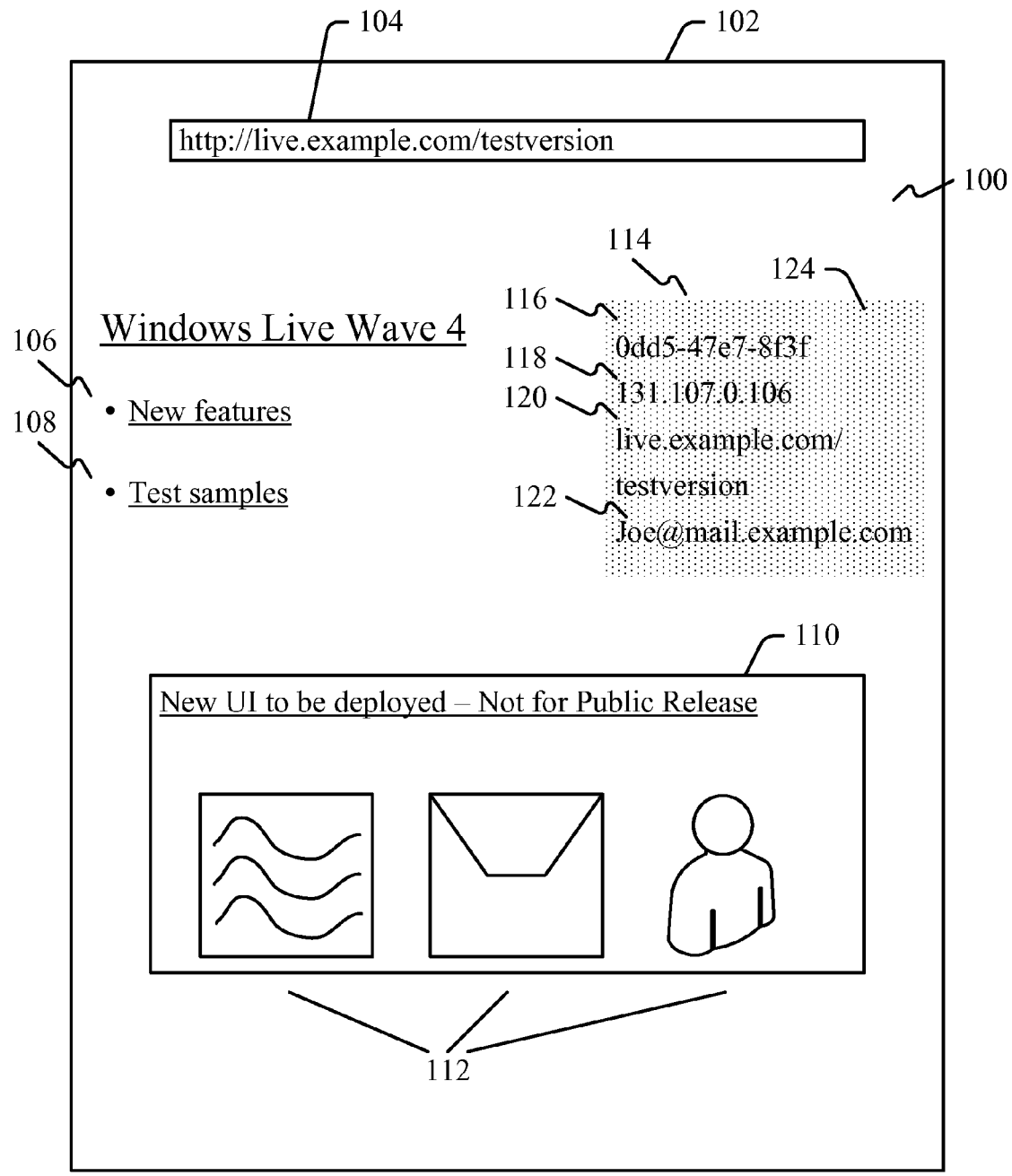
FIG. 1 is a block diagram of an example user interface that may be watermarked.

Businesses and other organizations often make information available to their employees in digital form. For example, a software company might operate a server running a test version of software that has not yet been deployed to the public, so that employees can test and evaluate the software. An engineering company might make proprietary designs and research available on a corporate intranet or through an access-restricted site. Or, a political campaign might store internal memos on a server, to which only employees of the campaign organization have access. All sorts of organizations have private information that they store in digital form.

One aspect of storing information in digital form is that it is relatively easy to disseminate the information. Before digital storage, leaking an organization's private information generally involved relating the information orally, or disseminating paper originals or paper copies of the information. When information is stored electronically, it is relatively easy to capture the information. In some cases, the original source of the information (e.g., a computer file) can simply be copied, and disseminated by disk, by e-mail, etc. However, some types of information do not lend themselves well to this kind of dissemination. For example, if a software company is testing a new service on an access-restricted server, the service itself (or even the code that implements the service) may not be easy to copy. However, a screen shot of the service can be taken and disseminated. In some cases, an employee might capture and display screen shots for their own reasons, contrary to the interest of his employer. However, capturing screen shots is a relatively simple act. Thus, a computer user might capture and post a screen shot as a result of confusion or mistake as to whether doing so is wrong. Regardless of the reason for which the screen shot is captured, once the screen shot has been posted, the company has lost proprietary information. Therefore, the company may want to find the source of the leaked screen shot, so that it can investigate, taken appropriate action, and deter such leaks in the future.

The subject matter described herein may be used to reconstruct the source of leaked information. When a company's private information is displayed (e.g., information on a company's private servers, which users access through a browser), the information may be watermarked with information from which the identity of the employee to whom the information was shown can be reconstructed. The watermark information may be included in a way that is difficult for the user to perceive visually, but that can be reconstructed through simple mechanisms. For example, the watermark information may be rendered in a web page against a solid background in a color that very slightly contrasts with the background. If a screen shot is captured of web page that has been watermarked in this manner, the screen shot can be edited with drawing software (or some other type of image-editing program) to perform a color change that increases the contrast and reveals the watermark. For example, the MICROSOFT PAINT program could be used for to perform this function.

Any appropriate type of information could be included in the watermark. However, one watermarking scheme is as follows. For each browser session, an experience identifier ("experience ID") could be created. Thus, each time a user starts a browsing session, that session would receive a distinct experience ID. The assigned experience ID would remain constant throughout the entire browsing session, from the time the browser is opened until the time that it is closed. In this sense, the experience identifier distinguishes a given instantiation of the browser from any other instantiation of the browser. Normal web sites would not make any use of the experience ID. However, the company's web sites could be instrumented to retrieve the experience ID, and to log events associated with that ID. Thus, when the company's employee visits an external web site, no information about the experience ID would be retrieved. However, when the company's employee visits one of the company's instrumented web sites (e.g., private test servers operated by the company), the experience ID would be retrieved from the browser, and a log would be created of the fact that the web site was visited. The experience ID may be included in a watermark applied to each of the pages served by the instrumented sites. If, during a browser session, additional information about the user is discovered, that information could also be included in the watermark. For example, if the user logs into an instrumented web site during a given browser session, then the user's login name could be included in the watermark. Or, the fact that the user has logged in during the browser session could be included in a usage log, where it is associated with the experience ID of that session.

In normal, authorized usage of a private web page, the web page is merely displayed to the user and is not disseminated in the form of a screen shot. Thus, any information about the user that is included in the watermark is not shown to anyone else, since the watermarked page is only supposed to be viewed by the authorized user. Any information about the user that is included in the page's watermark would only be shown to the public if the user chooses to capture a screen shot of the page and then make the page public, in violation of the user's agreement concerning the privacy of the page.

Turning now to the drawings, FIG. 1 shows an example user interface which may be watermarked. The user interface of FIG. 1 takes the form of an example web page 100, which may be displayed to a user through browser 102. Web pages and browsers are not the only context in which the subject matter herein could be used. Any type of content displayed through any type of software could be watermarked. However, for purposes of illustration, the examples herein show the use of a watermark scheme in connection with a web page displayed through a browser.

Browser 102 contains a navigation bar 104, indicating that the page that is being displayed is at the Uniform Resource Locator (URL) "http://live.example.com/testversion." Page 100 may be a version of a service that is being tested internally by a company prior to its deployment. Access to page 100 may be restricted to certain employees of a company. The restriction could be implemented in various ways. For example, a user might have to present certain login credentials in order to access page 100, or a user might have to access the page from a specific IP address that is associated with the company. An agreement may be in place between the company and its employees that calls for the employees to keep the company's private web pages private.

Example web page 100 is a test page for the service named "Windows Live Wave 4." Web page 100 contains various elements that may be relevant to the testing and internal evaluation of that service. For example, web page 100 may contain (or provide access to) new features 106 and test samples 108. Additionally, web page 100 may contain a new user interface 110, which is labeled "New UI to be deployed—Not for Public Release". The new user interface 110 may contain various graphics and other content 112, which is part of a new "look" for a service, and is not yet for public consumption.

In order to protect the company's interest in keeping the page private, the server that provides web page 100 may apply watermark 114 to web page 100. Watermark 114 may contain various elements. For example, watermark 114 may contain an experience ID 116, an IP address 118 from which web page 100 was accessed, the URL 120 of the web page itself, and the login name 122 of the user who is accessing the web page (if such login name is available). Watermark 114 may be applied in a way that is difficult for a user to discern visually, but that is relatively easy to recover. For example, watermark 114 might be printed against a solid background, in such a way that the color of the text is different—but very slightly different—from the color of the background. Or, in another example, the watermark text could be printed in a pattern that is similar to, but slightly different from, the pattern of the background against which it is printed. (In the example of FIG. 1—in order to illustrate which part of the drawing is the watermark and which part is the background—background 124 is shown as a dotted stipple pattern, and the text of watermark 114 is shown as solid black. However, in a real-world implementation, the watermark text and background may differ from each other more subtly than is shown.)

There are various considerations in choosing the contrast between the watermark test and the background. For example, as noted above, one may want the watermark text to be very similar in color and/or pattern to the background so that the existence of the watermark is difficult to see. However, one may want the text and background to be sufficiently different from each other that the distinction between them survives compression. Lossy compression schemes, such as those used with image content, may reduce the color depth of an image, thereby collapsing colors that are very close to each other into the same color. But if the text and background appear the same post-compression, then the watermark may not be recoverable. Thus, the amount of contrast between the watermark text and background may be chosen to be enough to allow the contrast to survive common image compression schemes, such as that used with the Joint Photographic Experts Group (JPEG) format.

Figure 2:
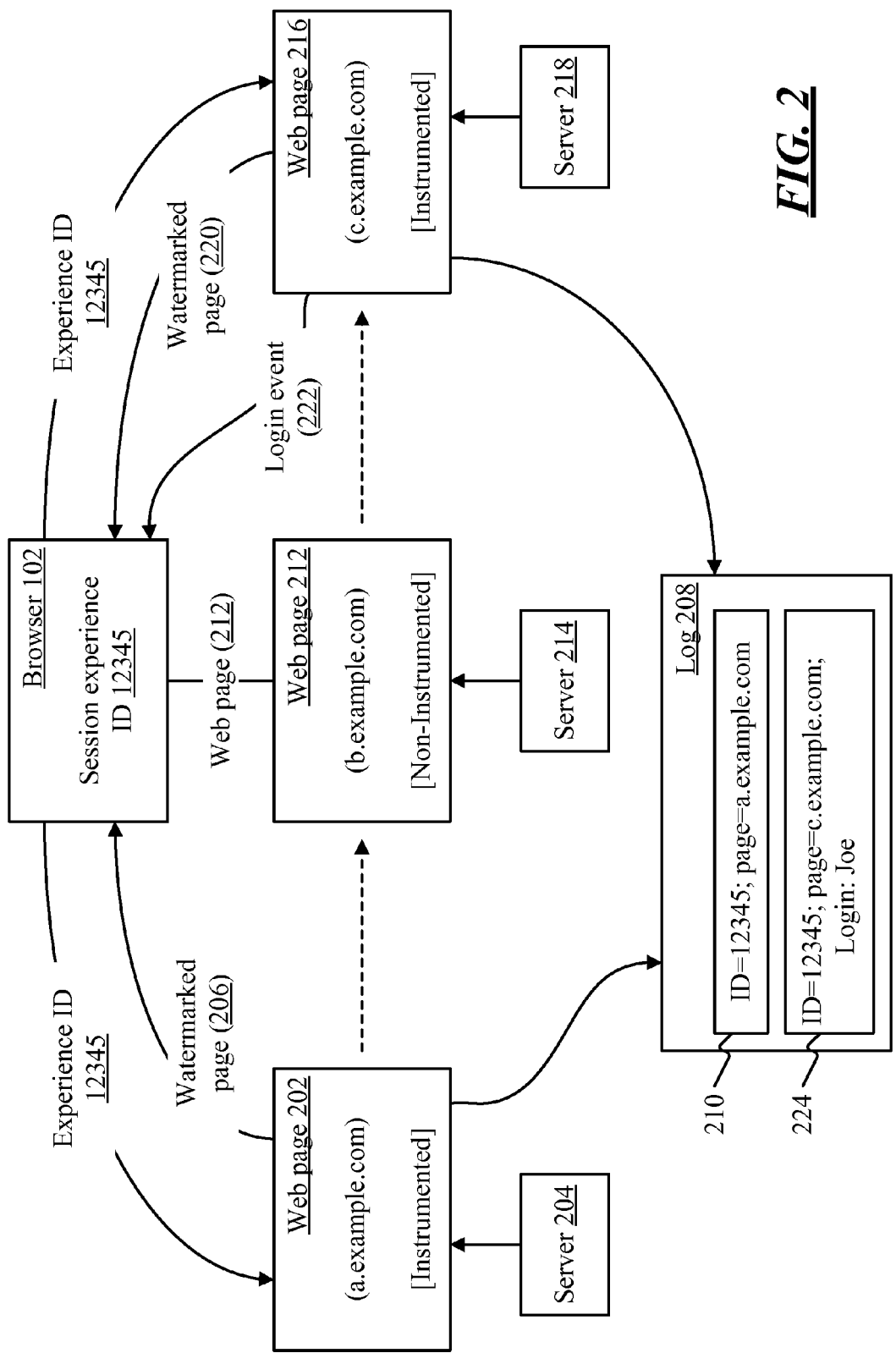
FIG. 2 is a block diagram of an example scenario in which the use of watermarks may occur.

FIG. 2 shows an example scenario in which the use of watermarks may occur. In the example of FIG. 2, a user starts browser 102, and uses browser 102 to visit a series of web pages. At the time that the user starts browser 102, an experience ID 12345 is created for the session. Experience ID 12345 will be used throughout the session, until browser 102 is closed and/or restarted.

The first page that the user visits is page 202, at the URL a.example.com. Page 202 may be served by server 204. Page 202 may be instrumented, in the sense that it contains code to obtain and/or use experience ID 12345 from browser 102. Thus, upon receiving a request for web page 202, server 204 obtains experience ID 12345 from browser 102. Server 204 then serves web page 202 to browser 102, so that it may be displayed on a display of a device on which browser 102 is running. Page 202 may be returned as a watermarked page 206, bearing a watermark such as that described above in connection with FIG. 1. In particular, watermarked page 206 may contain experience ID 12345. When an instrumented page is served, the event is recorded in log 208. For example, entry 210 in log 208 indicates that the page at a.example.com has been served to a browser under the experience ID 12345.

The sequence of pages that browser 102 visits is shown by the dotted line horizontal arrows connected the several web pages in FIG. 2. Thus, the next page that browser 102 visits is page 212. Page 212 is served to browser 102 by server 214, and is non-instrumented. It is noted that a user could visit any number of pages during a browsing session. For example, the user might visit a secret corporate page, then check his personal e-mail account, then visit another secret corporate page, then visit a shopping web site, then visit another secret corporate page, and so on. The secret corporate pages are likely to be instrumented by the corporation in order to protect the corporation's private information, while the other pages are not likely to be instrumented. Since page 212 is not instrumented (e.g., it might be a shopping web page operated outside of the company), it may be the case that no use of the experience ID is made by page 212. Thus, in the example of FIG. 2, no entry is made in log 208 regarding browser 102's visit to page 212.

The next page that browser 102 visits is page 216, which is served by server 218. Since web page 216 is instrumented, server 218 obtains experience ID 12345 from browser 102. (Server 218 may be the same as server 204; e.g., a single server might serve all instrumented web pages within a company. However, server 218 could be distinct from server 204.) Server 218 then watermarks page 216, and returns page 216 in the form of watermarked page 220. The fact that the browser with experience ID 12345 has visited page 216 is entered into log 208. Additionally, in this example, page 216 may contain a login screen that allows a user of browser 102 to log in. Server 218 may enter this login event 222 into log 208 as well. Thus, entry 224 in log 208 shows that the browser with experience ID 12345 has visited page 216 at c.example.com, and has also logged in under the username "Joe".

If, for example, the user of browser 102 were to take a screen shot of page 202 and post that page publicly, information in log 208 could help to identify that user. As indicated above, page 202 might be delivered to browser 102 in the form of watermarked page 206. The watermark might contain the experience ID 12345. Thus, if the watermarked page were to appear, for example, on a public blog, the watermark could be recovered from the page using mechanisms described above. This watermark would indicate that the screen shot was captured during the browsing session with experience ID 12345. By looking at log 208, it could be determined that whoever was operating a browser under experience ID 12345 at some later point logged in with the username "Joe". With this knowledge, an investigation of the source of the screen shot could focus on Joe, since it appears, from the log, that Joe is the person who took the screen shot of page 202.

Figure 3:
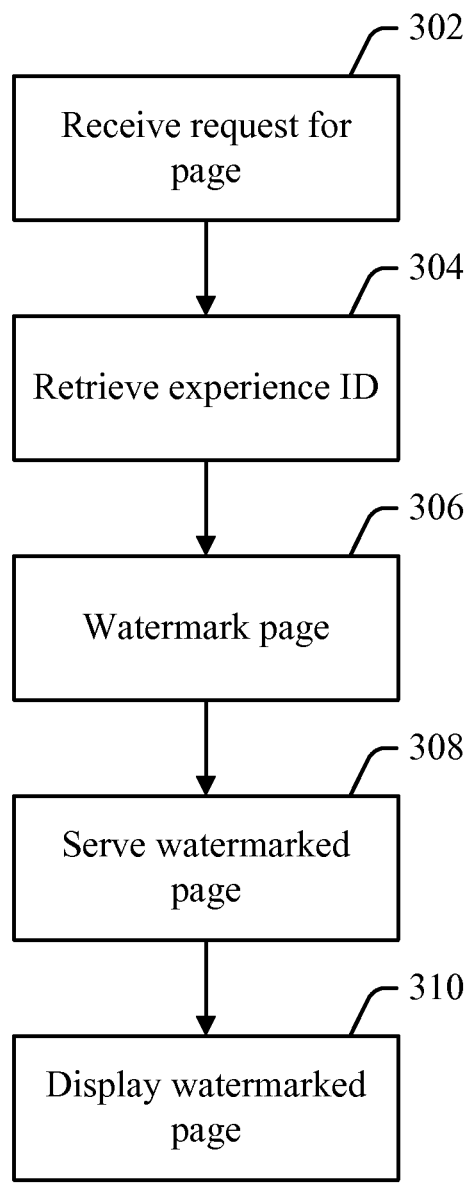
FIG. 3 is a flow diagram of an example process of providing a watermarked page.
Figure 4:
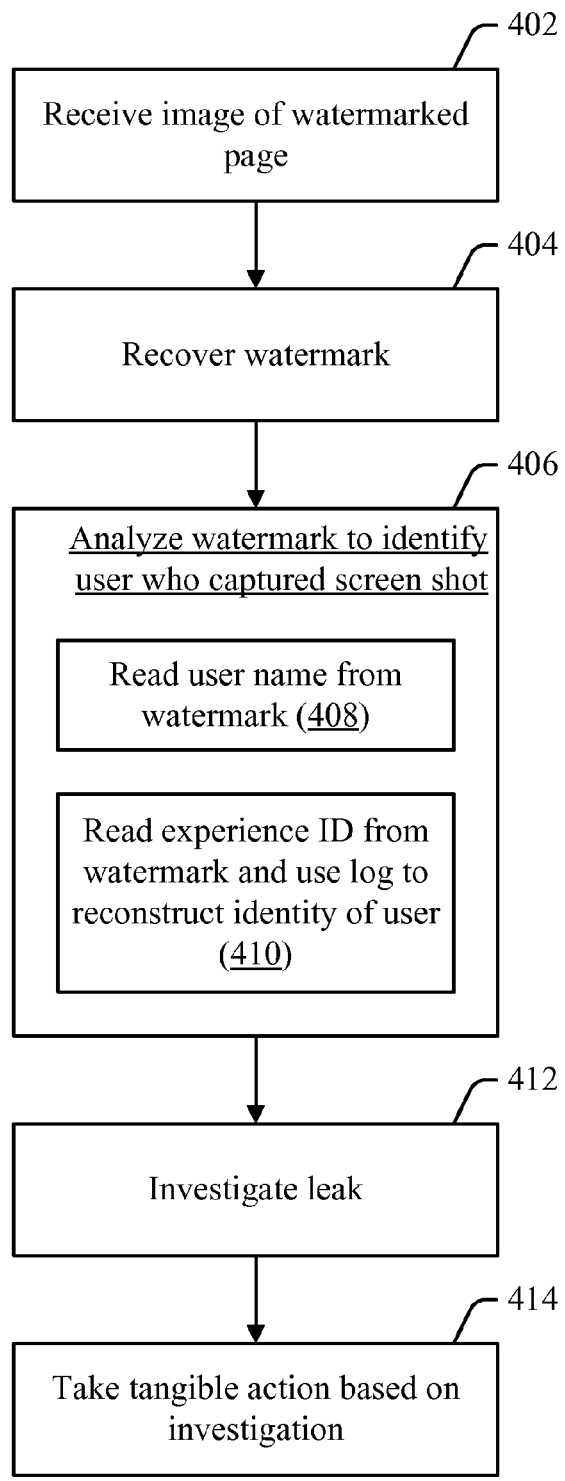
FIG. 4 is a flow diagram of an example process in which a watermarked contained in a page may be used.

FIG. 3 shows an example process of providing a watermarked page. Before turning to a description of FIG. 3, it is noted that the flow diagrams contained herein (both in FIG. 3 and in FIG. 4) are described, by way of example, with reference to components shown in FIGS. 1 and 2, although these processes may be carried out in any system and are not limited to the scenarios shown in FIGS. 1 and 2. Additionally, each of the flow diagrams in FIGS. 3 and 4 shows an example in which stages of a process are carried out in a particular order, as indicated by the lines connecting the blocks, but the various stages shown in these diagrams can be performed in any order, or in any combination or sub-combination.

At 302, a request for a page may be received. For example, the request may be received by one of the servers shown in FIG. 2. The request may be received from a browser, such as browser 102 (shown in FIGS. 1 and 2). Once the request is received, the experience ID may be retrieved, at 304, from the software (e.g., the browser) that submitted the request. The page to be served may then be watermarked at 306.

The watermark to be included in the page may contain various kinds of information. For example, the watermark may contain the experience ID that was retrieved at 304. As another example, the IP address from which the request came could be included in the watermark. As yet another example, the URL of the page itself could be included in the watermark. As yet another example, information about the requestor of the page may be included in the watermark. As described above in connection with FIG. 2, a log may show the login name of a user who requested a page under a particular experience ID. In the example discussed above in connection with FIG. 2, the page that appeared in a screen shot is a page that was watermarked before the login name was known. However, in another example, the page of which a screen shot is captured might be watermarked after the log contains sufficient information to associate a login name with an experience ID. Thus, if such a login name is known, it could be included in the watermark in order to simplify identification of the source of the page. As noted above, when a person's login name is included in a watermark, there is no danger that the person's login name would be disseminated inappropriately: In this example, the watermarked page is a private page that employees of a company have agreed not to disseminate. If the page containing the watermark in this example is disseminated, it is because an employee chose to disseminate a screen shot of a page in violation of the employee's agreement not to do so.

Once the page has been watermarked, the watermarked page may be served at 308. The watermarked page may then be displayed at 310. It is noted that the act of displaying a page may occur either at a client or at a server. For example, when a client machine displays a page on its screen, the client is performing the act of "displaying" the page. However, when the server sends the page to a client (or other machine) to be displayed, the server is, likewise, performing the act of "displaying" the page.

FIG. 4 shows an example process in which a watermarked contained in a page may be used to detect a source of a leak. At 402, an image of a page may be received. For example, a company might become aware that a screen shot of a private page has been posted on a public blog. This screen shot could then be downloaded, where it may be received by one of the company's computers for analysis. At 404, the watermark is recovered from the image of the page. In one example, a drawing program, such as the MICROSOFT PAINT program, could be used to edit the image by changing the colors. This change of color may reveal sufficient contrast to discern the text of the watermark. However, the watermark could be recovered using any appropriate tools.

At 406, the watermark may be analyzed to identify the user who captured the screen shot. This analysis may take place in various ways. Two example ways are shown in FIG. 4. One example way of identifying a user from the watermark (at block 408) is to read the user's name from the watermark, if the watermark contains that user's name. However, another way of identifying a user from the watermark (at block 410) is to read the experience ID from the watermark and use the log to reconstruct the identity of the user (as discussed above in connection with FIG. 2). It is noted that the watermark may be helpful, even if the user's identity cannot be determined. For example, even if the watermark does not lead to a specific user, it might lead to a particular organization. For example, the watermark might show a particular IP address that is associated with a particular organization. Thus, a leak of information might be traced to the organization associated with that IP address, even if the leak cannot be associated with a particular person.

Based on whatever information is recovered from the watermark, the leak may be investigated at 412. Then, based on the result of the investigation, a tangible action may be taken at 414.

Figure 5:
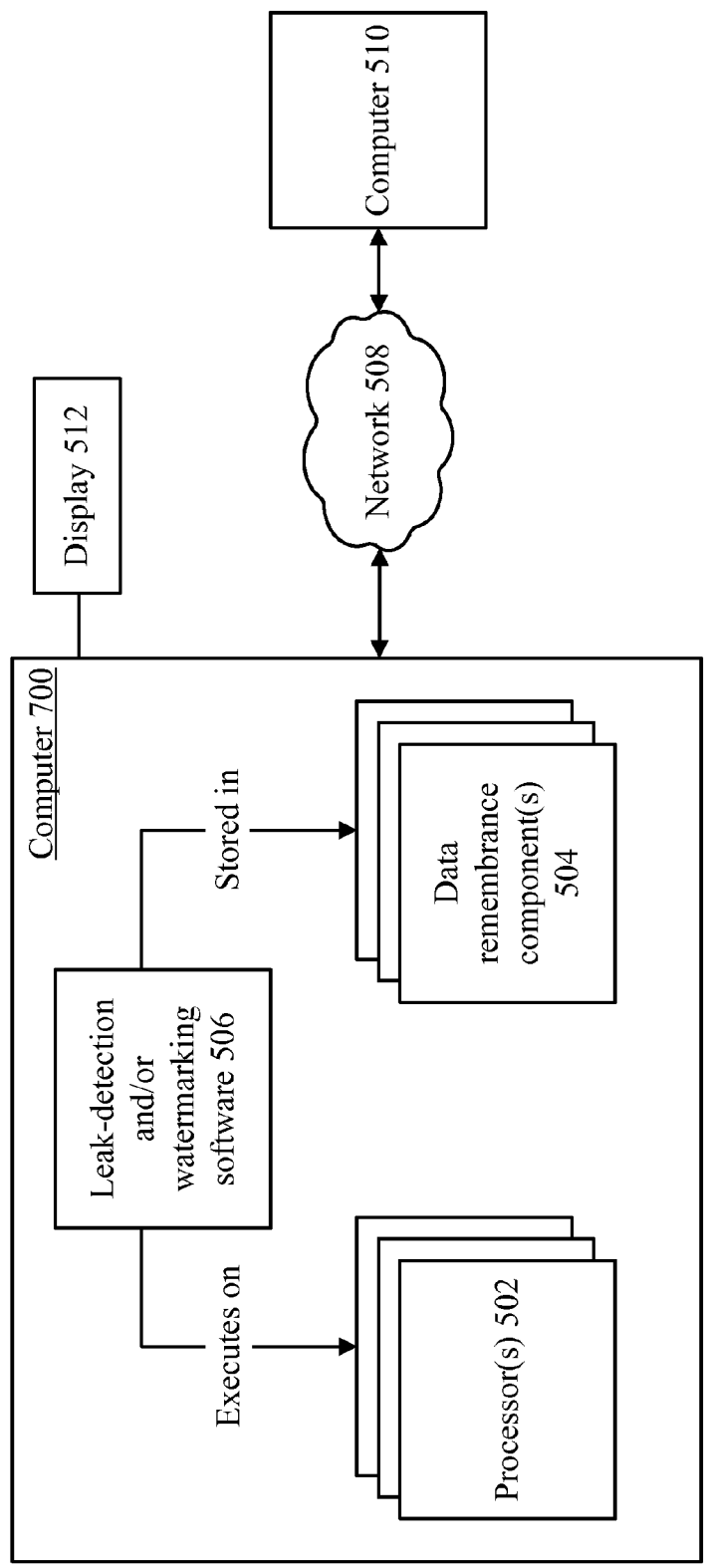
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is leak detection and/or watermarking software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to apply a watermark to content, wherein the executable instructions, when executed by a computer, cause the computer to perform acts comprising:
   receiving, from a program, a request for a web page;
   retrieving, from said program, an experience identifier, wherein said experience identifier distinguishes an instantiation of said program from other instantiations of said program, a new distinct experience identifier being created for each instantiation of said program, said experience identifier remaining constant from a first time at which said program is opened until a second time at which said program is closed;
   applying a watermark to said web page to create a watermarked page, wherein said watermark comprises said experience identifier;
   entering, in a log, a fact that said web page has been requested under said experience identifier;
   providing said watermarked page to said program;
   recovering said watermark from an image of a page that was captured with said program; and
   analyzing said watermark in said recovered page to identify a user that captured said image, said identity of said user being determined using both said watermark and a log of web pages that were visited under said experience identifier.

2. The one or more computer-readable storage devices of claim 1, wherein said acts further comprise:
   obtaining an IP address from which said web page has been requested; and
   including, in said watermark, said IP address.

3. The one or more computer-readable storage devices of claim 1, wherein said acts further comprise:
   including, in said watermark, a Uniform Resource Locator (URL) of said web site.

4. The one or more computer-readable storage devices of claim 1, wherein a user of said program submits login credentials to said web page, and wherein said acts further comprise:

entering, in said log, a fact that said user is associated with said experience identifier.

5. The one or more computer-readable storage devices of claim 1, wherein said web page comprises a background in a first color, and wherein said applying of said watermark comprises:
rendering said watermark on said background in a second color that is sufficiently different from said first color so that a distinction between said watermark and said background survives compression of an image of said web page.

6. The one or more computer-readable storage devices of claim 1, wherein said program comprises a web browser.

7. A method of using information contained in a watermark, the method comprising:
using a processor to perform acts comprising:
receiving an image of a web page, said image containing said watermark, said watermark containing an experience identifier that identifies a browser session during which said web page was retrieved, said browser session comprising a use of a browser program following an instantiation of said browser program, a new distinct experience identifier being created for each instantiation of said browser program, said experience identifier remaining constant from a first time at which said browser program is opened until a second time at which said browser program is closed;
recovering said watermark from said image;
analyzing said watermark to identify a user who captured said image of said web page, said identity of said user being determined using both said watermark and a log of web pages that were visited under said experience identifier; and
determining that said user has disseminated said image.

8. The method of claim 7, wherein said watermark contains said user's login name, and wherein said recovering of said watermark comprises:
reading said user's login name in said watermark.

9. The method of claim 7, wherein said watermark does not contain said user's login name, and wherein said recovering of said watermark comprises:
reading said experience identifier in said watermark;
determining, from a log, that a login event was performed with said user's login name under said experience identifier; and
based on determining that a login event was performed with said user's login name under said experience identifier, determining that said image of said web page was captured by said user.

10. The method of claim 9, wherein said login event was performed after said web page was captured.

11. The method of claim 7, wherein said watermark appears on a background of said web page in a contrasting color, and wherein said recovering of said watermark comprises:
using an image-editing program to change a color in said image in order to increase contrast between said background and said watermark.

12. The method of claim 7, wherein said watermark contains an IP address from which said web page was accessed.

13. The method of claim 7, wherein said watermark contains a URL of said web page.

14. A system for detecting an information leak, the system comprising:
a memory;
a processor;
a web server that serves a web page;
a watermarking component that is stored in said memory and that executes on said processor, wherein said watermarking component retrieves an experience identifier from a browser that requests said web page from said web server, and applies a watermark to said web page to create a watermarked web page, wherein said watermark comprises said experience identifier, a new distinct experience identifier being created for each instantiation of said browser, said experience identifier remaining constant from a first time at which said browser is opened until a second time at which said browser is closed; and
a leak detection component that receives an image of said watermarked web page, wherein said leak detection component recovers said watermark from said image, and wherein said leak detection component analyzes said watermark to identify a user who captured said image of said watermarked web page, said identity of said user being determined using both said watermark and a log of web pages that were visited under said experience identifier.

15. The system of claim 14, wherein said watermarking component applies said watermark by including said experience identifier in said web page in a first color against a background of a second color, wherein said first color and said second color are sufficiently different that a distinction between said watermark and said background survives a compression.

16. The system of claim 14, wherein said watermark further comprises an IP address from which said browser requests said web page.

17. The system of claim 14, wherein said watermark further comprises a Uniform Resource Locator (URL) of said web page.

18. The system of claim 14, further comprising:
a log, wherein said leak detection component retrieves, from said log, an event in which a login with a login name occurred under said experience identifier, and wherein said leak detection component determines that said user is associated with said login name.

19. The system of claim 14, wherein said watermark comprises a login name of said user.

20. The system of claim 14, wherein said leak detection component recovers said watermark by changing a color in which said watermark is printed to increase contrast between said watermark and a background against which said watermark is rendered.

* * * * *